(12) United States Patent
Vendrig

(10) Patent No.: US 8,576,303 B2
(45) Date of Patent: Nov. 5, 2013

(54) METHOD OF FOREGROUND/BACKGROUND SEPARATION

(75) Inventor: Jeroen Vendrig, Liberty Grove (AU)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/969,207

(22) Filed: Dec. 15, 2010

(65) Prior Publication Data

US 2011/0149117 A1 Jun. 23, 2011

(30) Foreign Application Priority Data

Dec. 22, 2009 (AU) .................................. 2009251086

(51) Int. Cl.
*H04N 5/262* (2006.01)
*G06K 9/34* (2006.01)

(52) U.S. Cl.
USPC .......................................... 348/239; 382/173

(58) Field of Classification Search
USPC ................ 348/222.1, 239; 382/164, 171, 173
See application file for complete search history.

(56) References Cited

U.S. PATENT DOCUMENTS

| | | | |
|---|---|---|---|
| 6,625,310 B2 | 9/2003 | Lipton et al. .................. | 382/173 |
| 7,430,369 B2 * | 9/2008 | Fukui .............................. | 396/78 |
| 7,961,217 B2 * | 6/2011 | Yamagishi .................. | 348/207.1 |
| 8,103,093 B2 * | 1/2012 | Blake et al. ................... | 382/164 |
| 2007/0160289 A1 | 7/2007 | Lipton et al. | |
| 2008/0152017 A1 | 6/2008 | Vendrig et al. | |
| 2008/0152236 A1 | 6/2008 | Vendrig et al. | |
| 2011/0032373 A1 * | 2/2011 | Forutanpour et al. ...... | 348/222.1 |
| 2011/0043699 A1 | 2/2011 | Springett et al. | |

FOREIGN PATENT DOCUMENTS

JP 2003338977 11/2003

OTHER PUBLICATIONS

Australian Office Action dated Nov. 23, 2012, in Australian Application No. 2009251086.

* cited by examiner

*Primary Examiner* — Timothy J Henn

(74) *Attorney, Agent, or Firm* — Fitzpatrick, Cella, Harper & Scinto

(57) ABSTRACT

Disclosed herein are a method, system, and computer program product for creating a scene model of a scene, for separating a background and a foreground of at least one frame in an image sequence depicting the scene. The method includes the following steps, dependent upon a stability measure associated with the scene model being less than a stability threshold: (i) capturing a frame in the image sequence (305); (ii) recording the captured frame to a stored video sequence (335), dependent upon a recording session being active (330); (iii) updating an initial scene model, based on the captured frame (340); (iv) determining the stability measure associated with the scene model (340); and (v) providing a feedback, dependent upon the stability measure being less than a stability threshold (370). Then, dependent upon the recording session being active, the method captures at least one subsequent frame in the image sequence and records each captured subsequent frame to the stored video sequence (335). Finally, the method produces a scene model (380) that distinguishes background from foreground in the scene, based on the updated initial scene model.

16 Claims, 11 Drawing Sheets

A) 0 seconds (start)

B) 20 seconds

C) 22 seconds

D) 30 seconds

METHOD OF FOREGROUND/BACKGROUND SEPARATION

RELATED APPLICATION

This application claims the right of priority under 35 U.S.C. §119 based on Australian Patent Application No. 2009251086 entitled "Method of Foreground/Background separation", filed on 22 Dec. 2009 in the name of Canon Kabushiki Kaisha, the entire contents of which are incorporated herein by reference as if fully set forth herein.

TECHNICAL FIELD

The present disclosure relates to object detection in videos and, in particular, to foreground/background separation using scene modelling.

BACKGROUND

Background modelling involves modelling the visual content of a scene, based on an image sequence depicting the scene. Background modelling allows a video analysis system to distinguish between transient foreground objects and the non-transient background, through a background-differencing operation.

In one example, including a camera with a fixed field of view, the background model may be a first frame of an image sequence, based on the assumption that the first frame is known to contain non-transient content only. Background-differencing is then performed by subtracting a later frame in the image sequence from the background model to classify portions of the scene as foreground or background. Regions of an image that are different from the background model are classified as foreground and regions of an image that are similar to the background model are classified as background. The definitions of "different" and "similar" depend upon the background modelling method being used.

In another example of a background model, video frames depicting a scene comprise 8×8 DCT (Discrete Cosine Transform) blocks associated with each position in the scene. For each position, several mode models are maintained. The mode models relate to different visual content of the 8×8 blocks encountered at the same scene position, but at different points in time in the image sequence. If a block in a new incoming frame is similar to an existing mode model, the existing mode model can be updated. If the block in a new incoming frame is different from all existing mode models for the scene position, a new mode model is created and initialised with the values of the block in the new incoming frame.

If the closest matching mode in the background model is sufficiently similar to the DCT block in the incoming image sequence, the closest matching mode in the background model is updated with the DCT block data in the incoming image sequence. Otherwise, a new mode in the background model is created.

By keeping track of the temporal characteristics of a mode model and a count of the update frequency of the mode model, a decision can be made as to whether a mode model represents foreground or background. For example, if the time that has passed since the mode was created is longer than a predetermined threshold value, the mode may be classified as background. Otherwise, the mode is classified as foreground. In another example, a mode is classified as background if the mode was updated more times than a threshold value. If this is not the case and the mode had not been updated more times than a threshold value, the mode is classified as foreground.

The comparison between a block and a mode model is based on a similarity measure, rather than an exact match. The reason is that the captured representation of the real world varies even when the real world is constant. In addition, there can be small variations in the visual appearance of the real world while there is no semantic change in the scene. For example, a change in lighting changes the visual appearance of objects captured by a sensor. An example of background-differencing using a block/mode model similarity comparison method is the calculation of the weighted sum of the differences between modelled DCT coefficients and DCT coefficients of a block of a frame undergoing analysis. The calculated weighted sum is compared to a predefined threshold to determine whether the modelled DCT coefficients are sufficiently similar to the DCT coefficients of the block or not.

Background modelling systems may incorporate techniques to update a scene model (also referred to, throughout this specification, as a "background model") based on a latest observed image from a frame that is being processed. The update techniques allow background modelling systems to cope with structural changes in the scene. For example, a new painting in a museum will initially be detected as a foreground object, but after some time the painting becomes part of the background model.

The assumption that a background modelling system is initialised with an empty scene is reasonable for security systems with fixed view cameras. A setup time to create a background model from one or more initial frames is insignificant compared to the months or years that a camera will observe the same scene. However, for other scenarios, such as a camera tour (where a pan-tilt camera alternates between various preset views) or consumers shooting short home video movies, or video snippets, the required setup time is too onerous. In addition, in the home video scenario, any setup time would reduce the spontaneity of the recording. For home videos, the value of the recording is often known only after the recording has finished, well after the time for any initialisation of a background model.

In one approach, a recording of video frames is made without initialising a background model based on an empty scene. When the recording is finished, the photographer waits until the scene is empty, and then makes a background photo that is used for subtraction from frames of the earlier recording to identify foreground objects. This approach is very sensitive to impulse noise, and thus results in low quality foreground separation. This approach is also sensitive to scene changes, such as lighting changes, that happen during the time that the photographer is waiting for the scene to become empty. Finally, this approach requires the photographer to keep the camera still for a long time, as movement of the camera during the recording results in misalignment between the recorded video and the background photo. The misalignment between the recorded video and the background photo in turn results in poor foreground separation.

Therefore, there is a need to provide a method that reduces the time that a scene is captured for the purpose of enabling foreground/background separation.

SUMMARY

It is an object of the present invention to overcome substantially, or at least ameliorate, one or more disadvantages of existing arrangements.

According to a first aspect of the present disclosure, there is provided a computer-implemented method of activating a scene model stability indicator of a camera for a scene model of a scene to separate a background and a foreground. The method captures at least one frame in an image sequence and updates a scene model based on at least one of the captured frames from a start time to a current time. The method then determines a scene model stability associated with a current updated scene model, and controls a display of a scene model stability indicator of a camera while capturing frames, to notify a user that the current updated scene model can be used to separate the foreground from the background in the scene, dependent upon the determined scene model stability.

According to a second aspect of the present disclosure, there is provided a camera system for activating a scene model stability indicator of a camera for a scene model of a scene to separate a background and a foreground. The camera system includes an optical system, a sensor, a storage device for storing a computer program, and a controller coupled to each of the optical system and the sensor to capture at least one frame in an image sequence.

The controller includes a processor for executing the program, the program including computer program code for updating a scene model based on at least one of the captured frames from a start time to a current time, computer program code for determining a scene model stability associated with a current updated scene model, and computer program code for controlling a display of a scene model stability indicator of a camera while capturing frames, to notify a user that the current updated scene model can be used to separate the foreground from the background in the scene, dependent upon the determined scene model stability.

According to a third aspect of the present disclosure, there is provided a computer readable storage medium having recorded thereon a computer program for directing a processor to execute a method of activating a scene model stability indicator of a camera for a scene model of a scene to separate a background and a foreground. The computer program includes code for performing the steps of:

capturing at least one frame in an image sequence;
updating a scene model based on at least one of the captured frames from a start time to a current time;
determining a scene model stability associated with a current updated scene model; and
controlling a display of a scene model stability indicator of a camera while capturing frames, to notify a user that the current updated scene model can be used to separate the foreground from the background in the scene, dependent upon the determined scene model stability.

According to a fourth aspect of the present disclosure, there is provided a computer-implemented method of creating a scene model of a scene, and separating a background and a foreground. The method captures at least one frame in an image sequence and updates a scene model based on at least one of the captured frames from a start time to a current time. The method determines a scene model stability associated with a current updated scene model and determines the current updated scene model as a final scene model to distinguish background from foreground in the scene, dependent upon the scene model stability being less than a threshold. The method utilizes the final scene model to separate the foreground from the background in the scene from the start time of the capturing the image sequence.

According to a fifth aspect of the present disclosure, there is provided a camera system for creating a scene model of a scene, and separating a background and a foreground. The camera system includes an optical system, a sensor, a storage device for storing a computer program, and a controller coupled to each of the optical system and the sensor to capture the image sequence. The controller includes a processor for executing the program, wherein the program includes computer program code for: capturing at least one frame in an image sequence; updating a scene model based on at least one of the captured frames from a start time to a current time; determining a scene model stability associated with a current updated scene model; determining the current updated scene model as a final scene model to distinguish background from foreground in the scene, dependent upon the scene model stability being less than a threshold; and utilizing the final scene model to separate the foreground from the background in the scene from the start time of the capturing the image sequence.

According to a sixth aspect of the present disclosure, there is provided a computer readable storage medium having recorded thereon a computer program for directing a processor to execute a method of creating a scene model of a scene, and separating a background and a foreground. The computer program includes code for performing the steps of: capturing at least one frame in an image sequence; updating a scene model based on at least one of the captured frames from a start time to a current time; determining a scene model stability associated with a current updated scene model; determining the current updated scene model as a final scene model to distinguish background from foreground in the scene, dependent upon the scene model stability being less than a threshold; and utilizing the final scene model to separate the foreground from the background in the scene from the start time of the capturing the image sequence.

According to a seventh aspect of the present disclosure, there is provided a method of creating a scene model of a scene for separating a background and a foreground of a plurality of frames in an image sequence depicting the scene. The method includes the steps of:

dependent upon a stability measure associated with the initial scene model being less than a stability threshold, performing the steps of:
  (i) updating an initial scene model based on at least one frame from the image sequence;
  (ii) updating the stability measure, based on the updated initial scene; and
  (iii) providing a feedback, dependent upon the stability measure being less than the stability threshold; and
producing the scene model, based on the updated initial scene model.

According to an eighth aspect of the present disclosure, there is provided a method of creating a scene model of a scene for separating a background and a foreground of a plurality of frames in an image sequence depicting the scene. The method includes the steps of:

creating an initial scene model for the scene;
dependent upon a stability measure associated with the initial scene model being less than a stability threshold, performing the steps of:
  (i) updating the initial scene model based on at least one frame from the image sequence; and
  (ii) updating the stability measure, based on the updated initial scene; and
producing the scene model, based on the updated initial scene model;

According to a ninth aspect of the present disclosure, there is provided a method of creating a scene model of a scene for separating a foreground and a background of a plurality of frames in an image sequence depicting the scene. The method includes the steps of:

capturing the image sequence, wherein the image sequence is delimited by a first frame to a second frame;

recording a plurality of frames of the image sequence;

updating a scene model based on at least one of the captured frames;

determining that the updated scene model distinguishes foreground from background of the scene;

separating foreground and background from at least one of the recorded frames, based on the scene model.

According to a tenth aspect of the present disclosure, there is provided a method of creating a scene model of a scene for separating a foreground and a background of a plurality of frames depicting the scene. The method includes the steps of:

capturing a first frame to a second frame of the image sequence;

recording the first frame to the second frame to a storage medium;

updating a scene model based on at least one frame from the image sequence, dependent upon the scene model being stable; and separating foreground and background of at least one of the recorded frames, based on the scene model.

According to an eleventh aspect of the present disclosure, there is provided a method of creating a scene model of a scene for foreground and background separation of a plurality of frames of an image sequence depicting the scene. The method includes the steps of:

capturing frames in the image sequence from a first frame to a second frame;

recording a plurality of frames between and including the first frame and the second frame, dependent upon a start trigger and an end trigger;

updating a scene model based on at least a plurality of frames from the first frame to a frame of the image sequence in which it is determined that the scene model is stable; and separating foreground and background in at least one of the recorded plurality of frames, based on the scene model.

According to a twelfth aspect of the present disclosure, there is provided a method of providing information relating to suitability of captured video content for creating a scene model of a scene for separating a foreground and a background of the scene. The method includes the steps of:

computing a measure of scene model stability based on the captured content; and providing a feedback to indicate that further video content is required to create the scene model, dependent upon the measure of scene model stability.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

One or more embodiments of the present disclosure will now be described with reference to the following drawings, in which.

DETAILED DESCRIPTION

Figure 1:
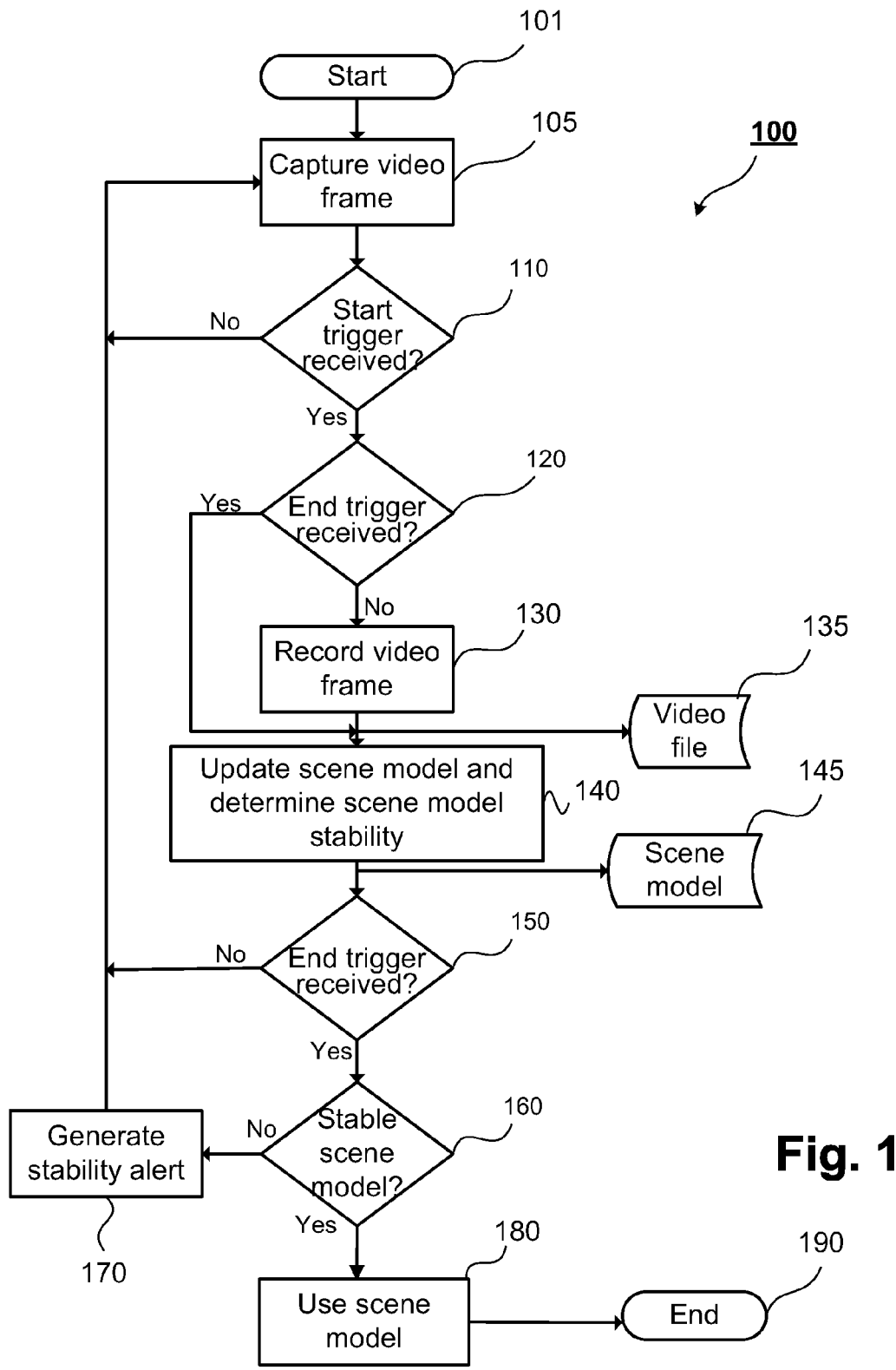
FIG. 1 is a schematic flow diagram illustrating a method of instant scene modelling according to one embodiment of the present disclosure.

Where reference is made in any one or more of the accompanying drawings to steps and/or features that have the same reference numerals, those steps and/or features have for the purposes of this description the same function(s) or operation(s), unless the contrary intention appears.

Overview

A video is a sequence of images or frames. The terms 'frame' and 'image' are used interchangeably throughout this specification to describe a single image in an image sequence. Each image (frame) of the video has an x axis and a y axis. An image is made up of visual elements. The visual elements may be, for example, pixels, or 8×8 DCT (Discrete Cosine Transform) blocks as used in JPEG images in a motion-JPEG stream, or wavelet transforms. A video may be encoded and compressed. Such encoding and compression may be performed intra-frame, such as motion-JPEG (M-JPEG), or inter-frame, such as specified in the H.264 standard.

An image sequence depicts a scene, and includes one or more successive frames. A scene is the information contained in a frame and may include, for example, foreground objects, background objects, or a combination thereof. In other words, a scene is a location observed by a camera and includes non-transient background, such as, for example, a couch. The scene may include transient foreground objects, such as, for example, a dancing child. The camera has a field of view. If the camera does not move, the field of view is fixed.

A scene model, or background model, is stored information relating to a background. A scene model generally relates to background information derived from one or more frames of an image sequence.

The purpose of performing foreground/background separation on a frame is to identify those parts in the frame that correspond to a foreground object and those parts in the frame that correspond to background. Foreground/background separation is useful for surveillance purposes, including the detection of unauthorised persons in restricted areas and the abandonment of parcels or other objects. Further, foreground/background separation is useful for video editing, and can be used to isolate one or more detected foreground objects. Once a foreground object has been isolated, the object can be enhanced, modified, edited, etc.

One arrangement of video processing creates a scene model for the purpose of performing foreground/background separation. A scene model models the content observed in an image sequence. The arrangement initialises the scene model with an incoming frame from the image sequence. For each visual element in the incoming frame, the arrangement creates an element model. For each element model, the arrangement creates a mode model, which is initialised with values from the corresponding visual element from the incoming frame. In one implementation, the visual element is a pixel of the incoming frame that is being processed. In a simple example, the values for the mode model are the intensity values of the pixels. In another example, the red, green and blue colour components of the pixel are modelled independently. In another arrangement, the visual element is an 8×8 DCT block and the values are selected DCT coefficients for the YCbCr colour space components, for example, the first 6 coefficients of the Y component, the DC coefficient of the Cb component, and the DC coefficient of the Cr component. The arrangement initialises a "hit counter", corresponding to the mode model, to 0, and sets a "creation frame" corresponding to the mode model to $t_{current}$, which is the number of frames that have elapsed since modelling started.

The arrangement then updates the scene model with information from subsequent incoming frames from the image sequence. The arrangement performs a mode model match operation as follows. The arrangement computes, for each visual element in the frame being processed, a similarity measure between an intensity value of the visual element and the intensity value of the mode models of the corresponding element model.

One implementation classifies the two intensity values as being similar if the difference between the intensity value of the visual element and the intensity value of the mode models of the corresponding element model is smaller than a threshold amount, say 5 in an intensity range from 0 to 255. Another implementation computes the standard deviation of modelled intensity values and utilises a dynamic threshold. The difference of the incoming intensity value and the mean of the mode model intensity value must then be smaller than, or equal to, a number of standard deviations, say 2.5. A further implementation selects a mode model for updating if the mode model is classified as being similar to the corresponding visual element of the incoming frame that is being processed. A further implementation checks all available mode models, and selects the best matching mode model for updating, if the best matching model is classified as being similar to the visual element of the incoming frame.

One implementation updates the mode model by taking a weighted average of the two intensity values. For example, the weight is 0.8 for the mode model value and 0.2 (i.e., 1.0-0.8) for the incoming value.

Another implementation increases the mode model value with a constant, say 1, if the incoming value is higher than the mode model value. This implementation decreases the mode model value with a constant, say 1, if the incoming value is lower than the mode value. There is no updating of the mode model value if the incoming value equals the mode model value. The hit counter corresponding to the mode model is increased by 1. If the two intensity values are not similar and not equal for any of the existing mode models, this implementation creates a new mode model and initialises the new mode model with the incoming intensity value. A hit counter corresponding to the new mode model is initialised to 0. The creation frame value corresponding to the mode model is set to $t_{current}$.

One arrangement determines foreground/background separation in the following manner. Consider an incoming frame I, on which the separation is to be performed, and a scene model S, where I(x,y) and S(x,y) refer to the same point (x,y) in the scene. For each visual element in I, the mode models of the corresponding element model in S are compared in a similar way to the mode model match operation. If no match is found, the visual element in I is classified as foreground. If a match is found, the hit counter of the matching mode model is compared to a threshold, say 1000 frames or 90% of the number of frames received, and the hit counter is used to update the scene model. If the hit counter value is greater than the threshold, the visual element is classified as background. Otherwise, the visual element is classified as foreground.

After separating foreground and background for each visual element in the frame, the original frame I has been transformed into a binary image. Connected components group visual elements that are neighbours and are either both foreground or both background. The arrangement then extracts connected components from the binary image using a floodfill algorithm.

The scene modelling approach to foreground separation requires that sufficient visual evidence of the scene is presented to the model so that the decision between foreground and background can be made. For example, in surveillance systems, a 5 minute empty scene is an accepted initialisation period for a scene modelling system. In a home environment, a 5 minute initialisation period is not acceptable, especially if the value of captured content is known only after the content has already been captured. To this end, the present disclosure provides an instant scene modelling method, which can start modelling at any point in the capturing process, and which provides guidance to users as to the actions required to achieve good foreground separation results.

The present disclosure provides a computer-implemented method of activating a scene model stability indicator of a camera for a scene model of a scene to separate a background and a foreground. The method captures at least one frame in an image sequence and updates a scene model, based on at least one of the captured frames from a start time to a current time. The method then determines a scene model stability associated with a current updated scene model and controls a display of a scene model stability indicator of a camera while capturing frames, to notify a user that the current updated scene model can be used to separate the foreground from the background in the scene. Control of the display is dependent upon the determined scene model stability.

The present disclosure also provides a computer-implemented method of creating a scene model of a scene, and separating a background and a foreground. The method captures at least one frame in an image sequence and updates a scene model based on at least one of the captured frames from a start time to a current time. The method then determines a scene model stability associated with a current updated scene model and determines the current updated scene model as a final scene model to distinguish background from foreground in the scene, dependent upon the scene model stability being less than a predefined threshold. The method then utilizes the final scene model to separate the foreground from the background in the scene from the start time of the capturing the image sequence.

The present disclosure provides a computer-implemented method of creating a scene model of a scene, for separating a background and a foreground of at least one frame in an image sequence depicting the scene. The method uses a scene model stability indicator (stability measure) associated with the scene model to determine whether the scene model is sufficiently stable to be used for subsequent use in video analysis to identify foreground and background objects in one or more frames of the image sequence.

Dependent upon the scene model stability indicator associated with the scene model being less than a stability threshold, the method includes the following steps. The method captures a frame in the image sequence. This may occur, for example, by using an optical system to focus the scene on a sensor, film, or other light-sensitive recording medium. The method records the captured frame to a stored video sequence, dependent upon a recording session being active. The stored video sequence is stored on a recording medium. In one implementation, the recording session is active in a time period between receiving a start trigger and an end trigger. In one example, a user of a camera activates a recording session by pressing a button on the camera and deactivates the recording session by pressing a button on the camera. In one implementation, the buttons to activate and deactivate the recording session are the same button. In another implementation, different buttons are used to activate the start trigger and the end trigger. In a further implementation, the user activates the recording session by depressing a button or lever, and deactivates the recording session by releasing the button or lever.

The method updates an initial scene model, based on the captured frame and determines the scene model stability indicator associated with the scene model. In one implementation, the method updates the initial scene model by using information from each captured frame. In another implementation, the method updates the initial scene model periodically, based on every n-th captured frame, to reduce computational expense, for example. The method then provides a feedback, such as triggering an alert, dependent upon the scene model stability indicator being less than a stability threshold. In one implementation, the alert includes an audible warning, a visual warning, or a combination thereof, when the stability measure is less than a stability threshold. The feedback notifies the user that the scene model is not yet sufficiently stable to be used for foreground separation, and further frames are required to update the scene model. Accordingly, the above steps are performed until the scene model stability indicator associated with the scene model reaches the stability threshold.

Dependent upon the recording session being active, the method captures at least one subsequent frame in the image sequence and records each captured subsequent frame to the stored video sequence. Thus, a user is able to record further frames from the image sequence, even once the scene model stability indicator associated with the scene model has reached the stability threshold. If the recording session is no longer active, no subsequent frames are recorded. The method optionally includes a further step of updating the initial scene model, based on at least one of the subsequent frames.

The method then produces a scene model to distinguish background from foreground in the scene, based on the updated initial scene model. The present disclosure also provides a camera system and a computer readable storage medium having recorded thereon a computer program for performing the above-mentioned method.

The method optionally includes the further step of creating the initial scene model, based on training data, random values, at least one frame from the image sequence, or any combination thereof. Training data can include, for example, expected or estimated values for visual elements in the scene that is being modelled.

The present disclosure also provides a method of creating a scene model of a scene for separating a background and a foreground of a plurality of frames in an image sequence depicting the scene. Dependent upon a stability measure associated with the initial scene model being less than a stability threshold, the method includes updating an initial scene is model based on at least one frame from the image sequence, updating the stability measure, based on the updated initial scene, and providing a feedback, such as by triggering an alert, dependent upon the stability measure being less than the stability threshold. The method then produces the scene model, based on the updated initial scene model.

The present disclosure further provides a method of providing information relating to suitability of captured video content for creating a scene model of a scene for separating a foreground and a background of the scene. The method computes a measure of scene model stability based on the captured content and provides a feedback, such as by triggering an alert, to indicate that further video content is required to create the scene model, dependent upon the measure of scene model stability.

System Implementation

Figure 2A:
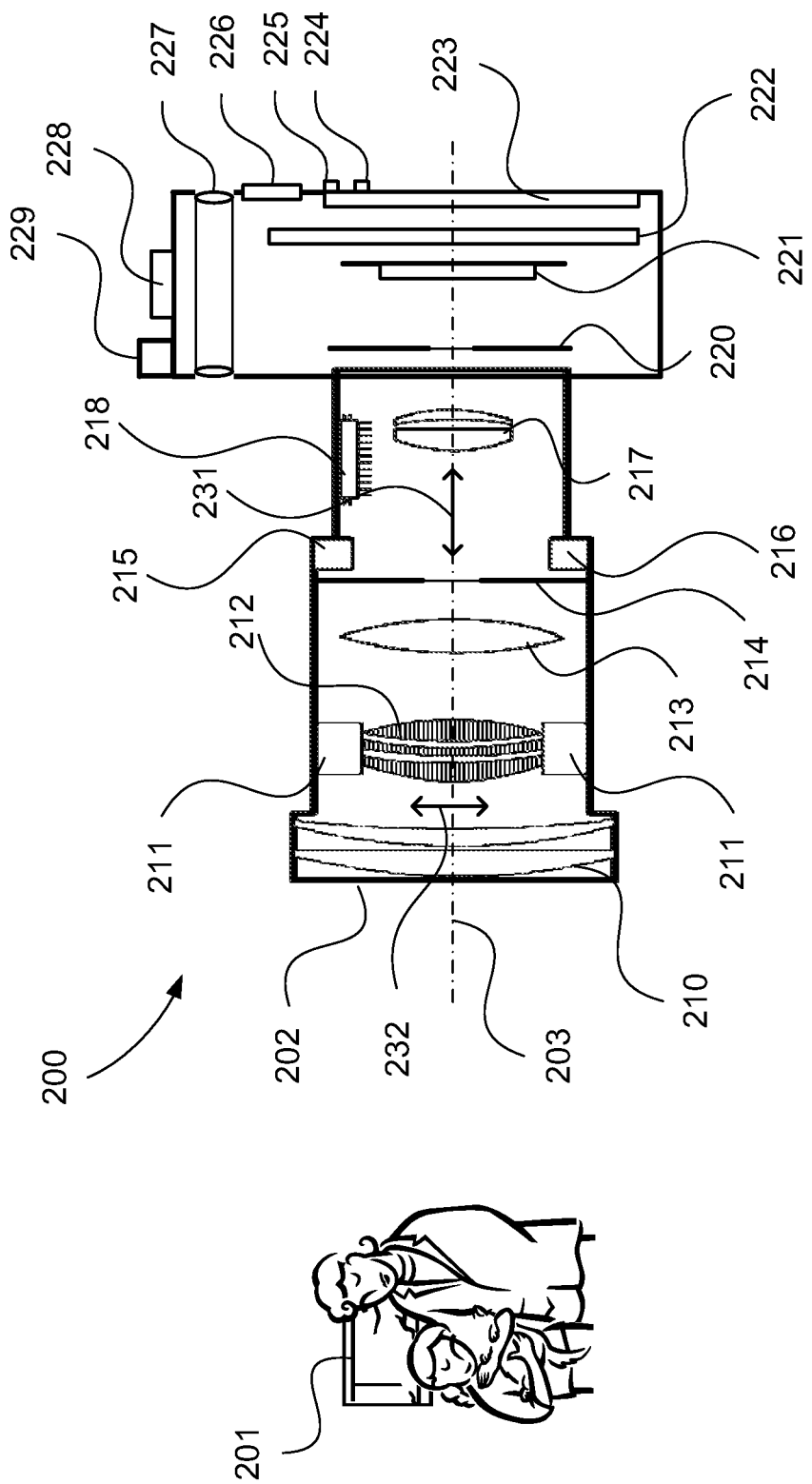
FIG. 2A is cross-section diagram of an exemplary image capture system 200, upon which the various arrangements described can be practised.

FIG. 2A is a cross-section diagram of an exemplary image capture system 200, upon which the various arrangements described can be practised. In the general case, the image capture system 200 is a digital still camera or a digital video camera (also referred to as a camcorder).

As seen in FIG. 2A, the camera system 200 comprises an optical system 202 which receives light from a scene 201 and forms an image on a sensor 221. The sensor 221 comprises a 2D array of pixel sensors which measure the intensity of the image formed on the sensor by the optical system as a function of position. The operation of the camera, including user interaction and all aspects of reading, processing and storing image data from the sensor 221, is coordinated by a main controller 222, which comprises a special purpose computer system. Thus, controller 222 is coupled to each of the optical system 202 and the sensor 221 to focus an image on the sensor 221 and capture one or more frames of the image in an image system. The special purpose computer system of the controller 222 is considered in detail below.

The user is able to communicate with the controller 222 via a set of buttons including a shutter release button 228, used to initiate focus and capture of image data, and other general and special purpose buttons 224, 225, 226 that may provide direct control over specific camera functions, such as flash operation, or support interaction with a graphical user interface presented on a display device 223. The camera system also includes an indicator light 229.

In a video camera, the shutter release button 228 is used to start and stop a recording, where the first use of the button is start, and the second use of the button is stop, for example. The display device may also have a touch screen capability to facilitate user interaction. Using the buttons and controls, it is possible to control or modify the behaviour of the camera. Typically, it is possible to control capture settings, such as the priority of shutter speed or aperture size when achieving a required exposure level, or the area used for light metering, use of flash, ISO speed, options for automatic focusing, and many other photographic control functions. Further, it is possible to control processing options such as the colour balance or compression quality. The display 223 is typically also used to review the captured image or video data. It is common for a still image camera to use the display to provide a live preview of the scene, thereby providing an alternative to an optical viewfinder 227 for composing a scene prior to still image capture and during video capture.

The optical system comprises an arrangement of lens groups 210, 212, 213 and 217 that can be moved relative to each other along a line 231 parallel to an optical axis 203 under control of a lens controller 218 to achieve a range of magnification levels and focus distances for the image formed at the sensor 221. The lens controller 218 may also control a mechanism 211 to vary the position, on any line 232 in the plane perpendicular to the optical axis 203, of a corrective lens group 212, in response to input from one or more motion sensors 215, 216 or the controller 222 so as to shift the position of the image formed by the optical system on the sensor. Typically, the corrective optical element 212 is used to effect an optical image stabilisation by correcting the image position on the sensor for small movements of the camera, such as those caused by hand-shake. The optical system may further comprise an adjustable aperture 214 and a shutter mechanism 220 for restricting the passage of light through the optical system. Although both the aperture and shutter are typically implemented as mechanical devices, the aperture and shutter may also be constructed using materials, such as liquid crystal, whose optical properties can be modified under the control of an electrical control signal. Such electro-optical devices have the advantage of allowing both shape and the opacity of the aperture to be varied continuously under control of the controller 222.

Figure 2B:
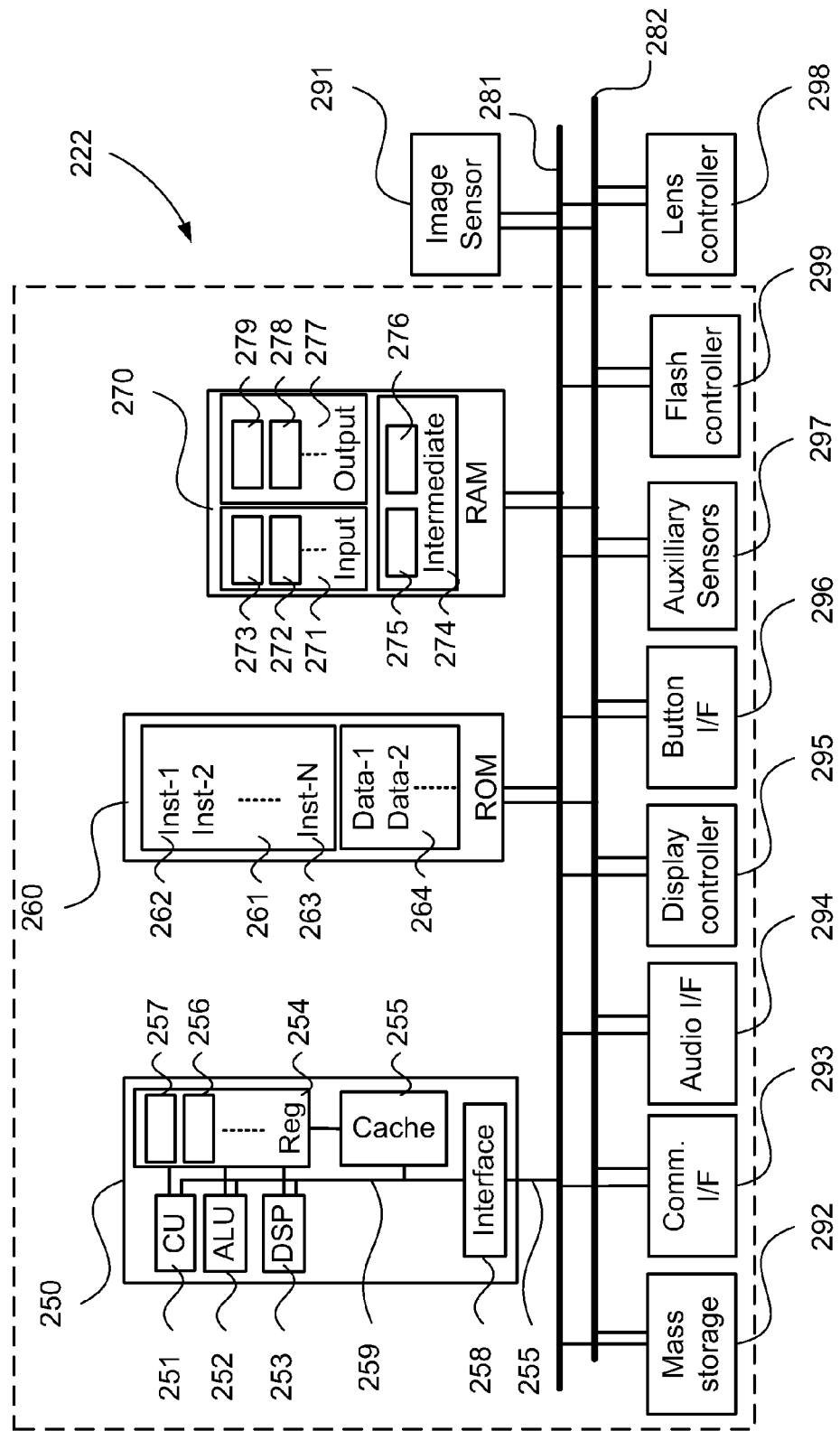
FIG. 2B is a schematic block diagram for the controller 222 of FIG. 2B, in which other components of the camera system which communicate with the controller are depicted as functional blocks.

FIG. 2B is a schematic block diagram for the controller 222 of FIG. 2A, in which other components of the camera system which communicate with the controller are depicted as is functional blocks. In particular, the image sensor 291 and lens controller 298 are depicted without reference to their physical organisation or the image forming process and are treated only as devices which perform specific pre-defined tasks and to which data and control signals can be passed. FIG. 2B also depicts a flash controller 299, which is responsible for operation of a strobe light that can be used during image capture in low light conditions as auxiliary sensors 297 which may form part of the camera system. Auxiliary sensors may include: orientation sensors that detect if the camera is in a landscape of portrait orientation during image capture; motion sensors that detect movement of the camera; other sensors that detect the colour of the ambient illumination or assist with autofocus, and so on. Although these are depicted as part of the controller 222, the auxiliary sensors may in some implementations be implemented as separate components within the camera system.

The controller comprises a processing unit 250 for executing program code, Read Only Memory (ROM) 260, and Random Access Memory (RAM) 270, as well as non-volatile mass data storage 292. In addition, at least one communications interface 293 is provided for communication with other electronic devices, such as printers, displays, and general purpose computers. Examples of communication interfaces include USB, IEEE1394, HDMI, and Ethernet. An audio interface 294 comprises one or more microphones and speakers for capture and playback of digital audio data. A display controller 295 and button interface 296 are also provided to interface the controller to the physical display and controls present on the camera body. The components are interconnected by a data bus 281 and control bus 282.

In a capture mode, the controller 222 operates to read data from the image sensor 291 and audio interface 294 and manipulate that data to form a digital representation of the scene that can be stored to a non-volatile mass data storage 292. In the case of a still image camera, image data may be stored using a standard image file format, such as JPEG or TIFF, or the image data may be encoded using a proprietary raw data format that is designed for use with a complimentary software product that would provide conversion of the raw format data into a standard image file format. Such software would typically be run on a general purpose computer. For a video camera, the sequences of images that comprise the captured video are stored using a standard format such as DV, MPEG, or H.264. Some of these formats are organised into files such as AVI or Quicktime, referred to as container files, while other formats such as DV, which are commonly used with tape storage, are written as a data stream. The non-volatile mass data storage 292 is used to store the image or video data captured by the camera system and has a large number of realisations, including, but not limited to: removable flash memory, such as a compact flash (CF) or secure digital (SD) card, memory stick, multimedia card, miniSD or microSD card; optical storage media such as writable CD, DVD or Blu-ray Disc; or magnetic media such as magnetic tape or hard disk drive (HDD), including very small form-factor HDDs such as microdrives. The choice of mass storage depends on the capacity, speed, usability, power and physical size requirements of the particular camera system.

In a playback or preview mode, the controller 222 operates to read data from the mass storage 292 and present that data using the display 295 and audio interface 294.

The processor 250 is able to execute programs stored in one or both of the connected memories 260 and 270. When the camera system 200 is initially powered up, system program code 261, resident in ROM memory 260, is executed. This system program permanently stored in the ROM of the camera system is sometimes referred to as firmware. Execution of the firmware by the processor fulfils various high level functions, including processor management, memory management, device management, storage management and user interface.

The processor 250 includes a number of functional modules, including a control unit (CU) 251, an arithmetic logic unit (ALU) 252, a digital signal processing engine (DSP) 253, and a local or internal memory comprising a set of registers 254 that typically contain atomic data elements 256, 257, along with internal buffer or cache memory 255. One or more internal buses 259 interconnect these functional modules. The processor 250 typically also has one or more interfaces 258 for communicating with external devices via the system data 281 and control 282 buses using a connection 255.

The system program 261 includes a sequence of instructions 262 to 263 that may include conditional branch and loop instructions. The program 261 may also include data which is used in execution of the program. This data may be stored as part of the instruction or in a separate location 264 within the ROM 260 or RAM 270.

In general, the processor 250 is given a set of instructions that are executed therein. This set of instructions may be organised into blocks that perform specific tasks or handle specific events that occur in the camera system. Typically, the system program will wait for events and subsequently execute the block of code associated with that event. This may involve setting into operation separate threads of execution running on independent processors in the camera system such as the lens controller 298 that will subsequently execute in parallel with the program running on the processor. Events may be triggered in response to input from a user as detected by the button interface 296. Events may also be triggered in response to other sensors and interfaces in the camera system.

The execution of a set of the instructions may require numeric variables to be read and modified. Such numeric variables are stored in RAM 270. The disclosed method uses input variables 271, which are stored in known locations 272, 273 in the memory 270. The input variables are processed to produce output variables 277, which are stored in known locations 278, 279 in the memory 270. Intermediate variables 274 may be stored in additional memory locations in locations 275, 276 of the memory 270. Alternatively, some intermediate variables may only exist in the registers 254 of the processor 250.

The execution of a sequence of instructions is achieved in the processor 250 by repeated application of a fetch-execute cycle. The Control unit 251 of the processor maintains a register called the program counter, which contains the address in memory 260 of the next instruction to be executed. At the start of the fetch execute cycle, the content of the memory address indexed by the program counter is loaded into the control unit. The instruction thus loaded controls the subsequent operation of the processor, causing for example, data to be loaded from memory into processor registers, the contents of a register to be arithmetically combined with the contents of another register, the contents of a register to be written to the location stored in another register, and so on. At the end of the fetch execute cycle, the program counter is updated to point to the next instruction in the program. Depending on the instruction just executed, this may involve incrementing the address contained in the program counter or loading the program counter with a new address in order to achieve a branch operation.

Each step or sub-process in the processes of flow charts is associated with one or more segments of the program 261, and is performed by repeated execution of a fetch-execute cycle in the processor 250 or similar programmatic operation of other independent processor blocks in the camera system.

The indicator light 229 is used to communicate a current status of the camera. When the camera is off, the light 229 is off. When the camera is turned on, the light 229 is on. In is one arrangement, the colour of light 229 is red. In another arrangement, the colour of light 229 is green when the camera is in display mode, and the colour is red when the camera is in capture mode. In one arrangement, the light 229 flashes when the camera is still executing a processing step, such as flushing video data from RAM 270 to SD card 292, even though the user wants to turn off the camera.

FIG. 1 is a flow diagram illustrating an embodiment of the instant scene modelling method 100 of the present disclosure. The modelling method 100 starts at a Start step 101, for example by turning on a digital video camera 200. In one arrangement, the camera is turned on by a long push on the shutter release button 228. In another arrangement, there is a dedicated on/off button 226. Control proceeds to step 105, which captures a video frame, and then to decision step 110 to check whether a start trigger has been received. In one arrangement, the start trigger is a push on a record button 228. In one arrangement, the camera suspends the capturing of frames until the start trigger has been received, to save battery power. In one arrangement, turning on the digital video camera is considered the start trigger. If no start trigger has been received at decision step 110, No, control returns to step 105 and the camera captures the next frame. If a start trigger has been received at decision step 110, Yes, the process continues to decision step 120, which checks whether an end trigger has been received.

In one arrangement, the end trigger is a second push on a record button 228, where the first push on the record button 228 is the start trigger. This is a usual arrangement on video cameras to start and stop recording with one button 228. In another arrangement, the start trigger is a first push on the record button 228, where the user depresses the record button 228 throughout the recording period. The end trigger is the user releasing the record button 228. In another arrangement, the end trigger is a push on a stop button 224. In yet another arrangement, the end trigger is a push on a foreground separation button 225 that indicates that the user wants to stop recording but that the user also wants to make sure the system has acquired sufficient information for scene modelling and accurate foreground separation.

If the check for receiving an end trigger at decision step 120 indicates that no end trigger has been received, No, control passes to a video frame recording step 130, which records the video frame captured from capturing step 105 and stores that video frame in a video file 135 on a storage medium 292. In one arrangement, known as intra-frame encoding, each video frame is stored as a JPEG image. In one embodiment, the file 135 is a sequence of individual video files, or alternatively the file 135 is one Motion JPEG (M-JPEG) video file comprising the JPEG images. In another arrangement, known as inter-frame encoding, the video frame is stored temporarily in a memory cache. The actual frame or the differences between frames in the cache are stored in the video file 135, for example as part of an MPEG-2 or MPEG-4 video file. After recording the video frame in step 130, control passes from step 130 to a scene model update step 140.

If at decision step 120 the check for receiving an end trigger indicates that an end trigger has been received, Yes, control jumps from decision step 120 to the scene model update step 140 immediately. That is, the visual content of the frame captured by the camera is not recorded by being stored, but the visual content is still being processed for scene modelling purposes.

The scene model update step 140 processes the captured video frame from capturing step 105. The scene model update step 140 compares the content of the video frame to a stored scene model and updates the scene model accordingly. In one arrangement, the scene model 145 is stored in volatile memory 270, such as dynamic random access memory (DRAM) or static random access memory (SRAM). In another arrangement, the scene model 145 is stored on non-volatile memory 292, such as a USB drive or a Secure Digital (SD) card.

After each update of the scene model, stability of the scene model is determined as well in updating step 140, based on content-dependent statistics of the scene model. Content-dependent statistics are different for each video, as opposed to content-independent statistics, such as a fixed time threshold that is a general setting of the capture device regardless of a specific recording. If scene model stability has been reached, the scene model is considered to be suitable for foreground/background separation. If scene model stability has not been reached, there is not yet enough evidence to do foreground/background separation successfully. That is, more updates of the scene model are needed.

Figure 6:
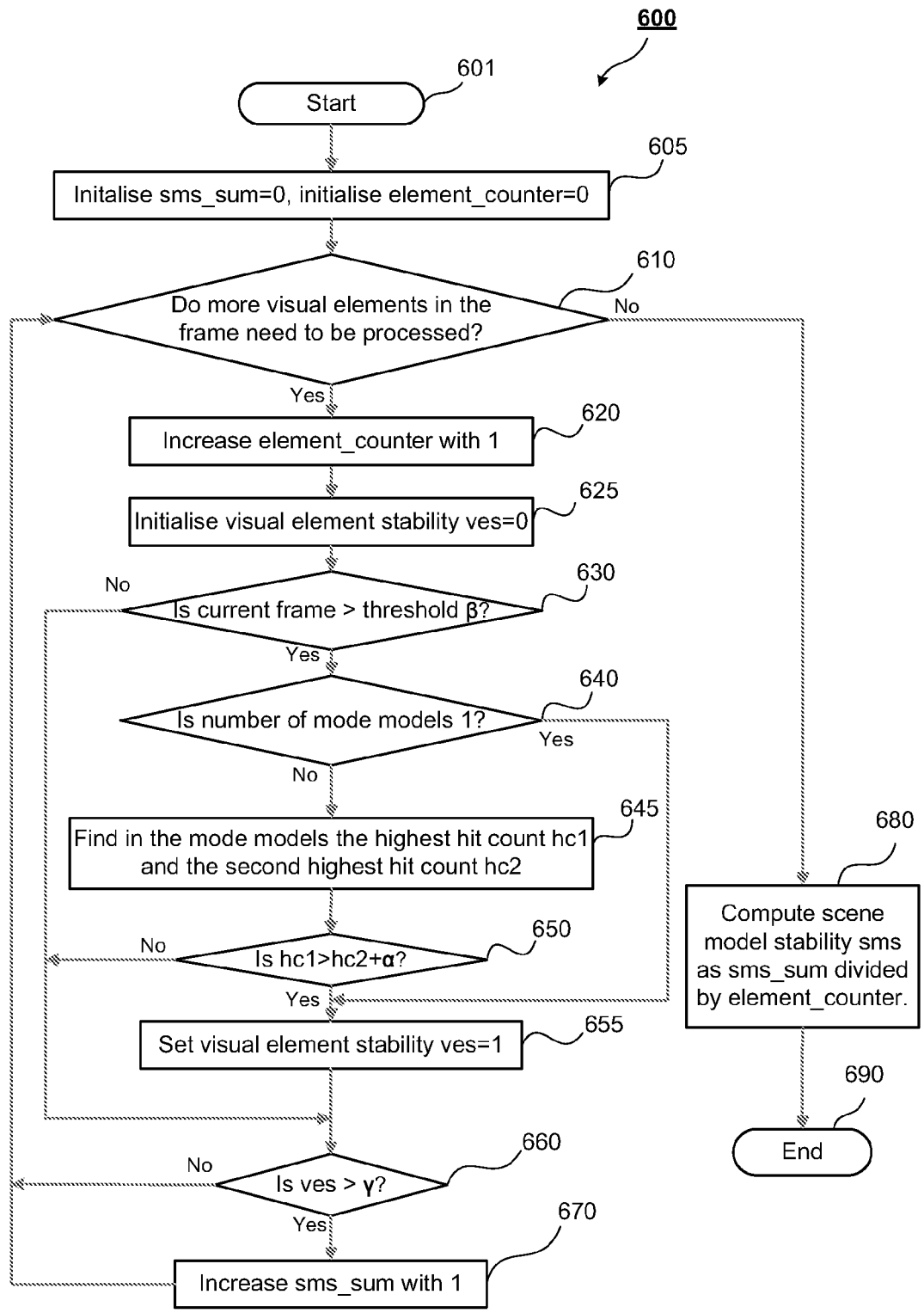
FIG. 6 is a schematic flow diagram illustrating a method of computing scene model stability according to one embodiment of the present disclosure.

FIG. 6 is a flow diagram illustrating a method 600 for computing scene model stability (sms). The method begins at a Start step 601 and proceeds to step 605 to initialise sms_sum to 0 and element_counter to 0.

In one arrangement, scene model stability is presented as a stability measure associated with the scene model, and the scene model stability is computed based on the visual element stability. Control passes from step 605 to a decision step 610, which checks if there is a visual element in the frame that needs to be processed. If there are no visual elements in the frame that need to be processed, "No", the flow continues to an sms computation step 680. If at step 610 there is a visual element in the frame that needs to be processed, "Yes", control passes to step 620, which increases the element_counter with a constant value, say 1. The visual element stability ves is initialised in step 625 to 0. For each visual element, the visual element stability is computed, as depicted in steps 630 to 655:

visual element stability =

$$\begin{cases} 1 & \text{if } (t_{current} > \beta) \wedge (\text{number of mode models is } 1) \vee (hc_1 > hc_2 + \alpha) \\ 0 & \text{otherwise} \end{cases}$$

where:
$t_{current}$ is the number of frames since modelling started;
$\beta$ is the minimum number of frames before a stability determination is made, say 5 frames;
$hc_1$ is the hit counter value of the mode model with the highest hit counter value;
$hc_2$ is the hit counter value of the mode model with the second highest hit counter value;
$\alpha$ is the stability threshold. In one arrangement, the value for $\alpha$ is absolute, say 10 frames. In another arrangement, the value for $\alpha$ is relative, say 20%*$hc_2$.

Control passes from step 625 to a minimum time check step 630, which compares the current frame number $t_{current}$ to a minimum time threshold $\beta$, say 5 frames. If the current frame $t_{current}$ is greater than the minimum time threshold $\beta$, Yes, the flow continues to a mode model check step 640. Otherwise, if the current frame $t_{current}$ is not greater than the minimum time threshold $\beta$, No, the flow continues from step 630 to a sms contribution check step 660. Mode model check step 640 checks the number of mode models. If the number of mode models is 1, Yes, the flow continues from step 640 to a visual element is stability setting step 655. Otherwise, if the number of mode models is greater than 1, No, the flow continues to a hit count selection step 645.

The Hit count selection step 645 sorts the hit counts of all mode models from high to low, and selects the highest hit count $hc_1$ and the second highest hit count $hc_2$. Note that because of the previous checks at steps 630 and 640, there are always at least 2 mode models when the method 600 reaches the hit count selection step 645. Control passes from step 645 to a hit count comparison step 650, which checks if the highest hit count $hc_1$ is significantly higher than the second highest hit count $hc_2$. The significance is defined by a stability threshold $\alpha$, say 10 frames. If $hc_1$ is significantly higher that $hc_2$, that is $hc_1 > hc_2 + \alpha$, Yes, the flow continues from step 650 to a visual element stability setting step 655.

The visual element stability setting step 655 sets ves to 1 and control passes to the sms_contribution check step 660. If at step 650 $hc_1$ is not significantly higher than $hc_2$, flow continues from step 650 to the sms_contribution check 660. Sms_contribution check 660 compares the visual element stability ves to a local stability threshold $\gamma$, say 0.5. If ves is higher than the local stability threshold $\gamma$, Yes, control passes to a sms_sum increasing step 670, which increases the sms_sum with a constant value, say 1.

Control passes from 670 and returns to the processing decision step 610. If at step 660 ves is equal to or lower than the local stability threshold $\gamma$, No, the flow immediately loops from step 660 back to the processing decision step 610.

When all visual elements that need to be processed have been processed and there are no remaining visual elements to process at step 610, the flow continues from step 610 to the sms computation step 680, which divides the sms_sum computed in step 670 by the element_counter computed in step 620. The flow passes to an End step 690 and the method 600 terminates.

In the above definition of visual element stability, the threshold $\beta$ is always applied. In another arrangement, if the value for stability threshold $\alpha$ is high, the threshold $\beta$ is applied only if the number of mode models is 1.

In another arrangement, the visual element stability is computed based on the ratio of $hc_1$ and $hc_2$, as follows:

$$\text{visual element stability} = 1 - \frac{hc_2}{hc_1}$$

In another arrangement, the difference between $hc_1$ and $hc_2$ is normalised by the time elapsed since modelling started:

$$\text{visual element stability} = \frac{hc_1 - hc_2}{t_{current}}$$

resulting in a value in the range 0 to 1, where $t_{current}$ is assumed to be 1 or greater. Note that $t_{current}$ will always be equal or greater than $hc_1$.

In another arrangement, the value $hc_1$ is used directly and normalised by the time elapsed since modelling started:

$$\text{visual element stability} = \begin{cases} \dfrac{hc_1}{t_{current}} & \text{if } t_{current} > \beta \\ 0 & \text{otherwise} \end{cases}$$

The scene model stability is determined on a frame basis, using the visual element stability computed for the individual visual elements. In one arrangement, all visual elements in the frame are used to compute scene model stability. In another arrangement, a checkerboard pattern (alternating between visual elements with odd and even positions along the X dimension for each row of visual elements) is used to select visual elements. Other sets of visual elements can be utilised to determine scene model stability, depending on the particular application. The sets of visual elements may relate, for example, to one or more specific portions of a frame, every n-th visual element in the x dimension of each row, or every n-th visual element in the y direction of each column.

Let ves denote the visual element stability. In one arrangement, scene model stability indicator sms is the average of the ves values:

$$sms = \frac{\sum_{\text{each visual element}} ves}{\text{number of visual elements}}$$

In another arrangement, scene model stability indicator sms is based on the number of visual elements considered stable:

$$sms = \frac{\sum_{\text{each visual element}} \begin{cases} 1 & \text{if } ves > \gamma \\ 0 & \text{otherwise} \end{cases}}{\text{number of visual elements}}$$

where $\gamma$ is the local stability threshold, say 0.5.

In another arrangement, scene model stability indicator sms is set to 1 if every 3×3 square of visual elements in the frame has at least 6 visual elements with a ves greater than a threshold, say 0.8.

In one arrangement, the scene model is considered stable when sms is greater than a threshold value, say 0.9.

In another arrangement, the scene model is considered stable when:
- a foreground object with a size greater than a minimum size threshold, say 16 visual elements, has been detected; AND
- for a percentage of the visual elements corresponding to the foreground object, say 80%, there is a mode model for the visual element with a creation frame<$t_{current}$ and a hit counter value greater than a minimum time threshold, say 10 frames.

Control passes from updating step 140 to decision step 150, which checks whether an end trigger has been received. In one arrangement, this check uses the same information as the previous check in decision step 120 for receiving an end trigger. In another arrangement, this check in decision step 150 is performed independently.

If the check for receiving an end trigger in decision step 150 indicates that no end trigger has been received, No, control returns to capture the next video frame in decision step 105 and the process repeats. If the check for receiving an end trigger at decision step 150 indicates that an end trigger has been received, Yes, control passes to decision step 160 to check for a stable scene model. A scene model is considered stable when there is deemed to be sufficient evidence to classify the visual elements in the video as foreground or background. Details of scene model stability have been described above.

If the check for a stable scene model at checking step 160 determines that the scene model is not stable, No, a stability alert is generated in alerting step 170. In one arrangement, the stability feedback, or alert, is an audible sound or warning, for example, a beep or a pre-recorded audio message through a speaker 294. In another arrangement, the stability feedback, or alert, is a visual indicator or message on the camera display 223, or visible in the optical viewfinder 227, communicated via the display controller 295. An example of the audio message or the display message is "Please keep camera steady and direct field of view to be empty so that foreground separation can be performed". In another arrangement, the stability feedback is a blinking on/off light 229 on the camera. In a further embodiment, the stability alert is a combination of a visual and audible warning. In one implementation, a user is able to select the type of stability feedback. Control is then transferred back from alerting step 170 to the video frame capture step 105. In one arrangement, the feedback generation 170 is done in parallel to the video frame capture step 105 and the following steps.

If the check for a stable scene model at checking step 160 determines that the scene model is stable, Yes, control transfers to a use of scene model step 180. In one arrangement, decision step 160 utilises a time-out threshold. That is, even if the scene model is not considered stable after a predetermined threshold time, say 30 seconds, after the end trigger is received, control passes to the use of scene model step 180 or to an End step 190.

In the use of scene model step 180, the stable scene model is used for separating foreground in a frame from the stable background. In one arrangement, the stored scene model 145 is subtracted from each frame of the stored video file 135. It will be appreciated that each frame of the stored video file 135 may equally be subtracted from the stored scene model 145, without departing from the spirit and scope of the present disclosure. The results are thresholded, resulting in foreground masks and background masks. In one arrangement, the foreground masks are stored as metadata for the video file 135. In one arrangement, the foreground mask metadata are stored in a separate file associated with video file 135. In another arrangement, the foreground mask metadata are part of the video file 135. This may be implemented, for example, by including a description in the JPEG headers of JPEG frames in an M-JPEG file.

Figure 3:
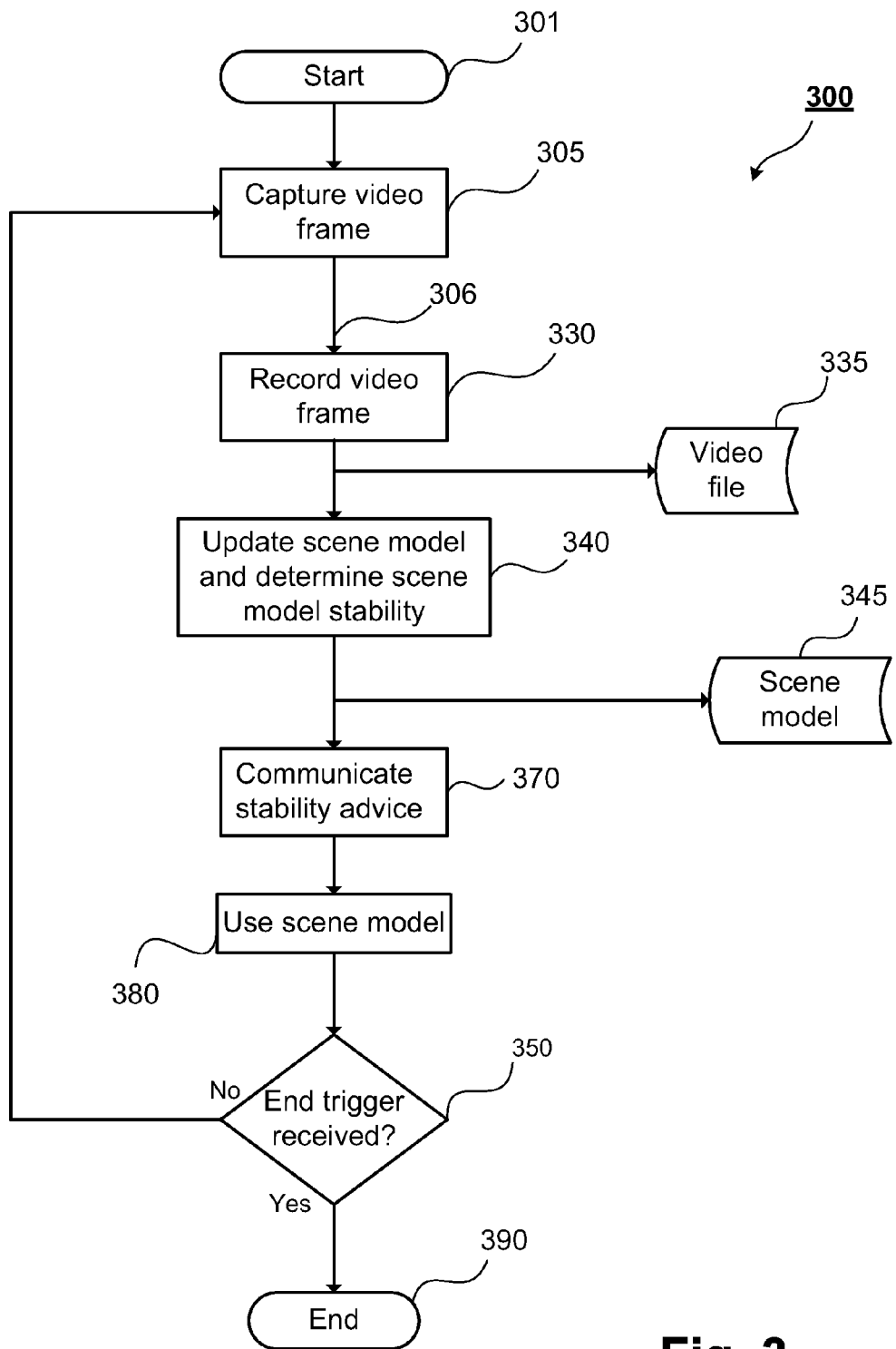
FIG. 3 is a schematic flow diagram illustrating a method of instant scene modelling according to one embodiment of the present disclosure.

FIG. 3 is a flow diagram 300 illustrating another arrangement of the instant scene modelling method of the present disclosure. The process starts at a Start step 301. The Start step 301 may include, for example, turning on a digital video camera. Control passes from the Start step 301 to a video frame capture step 305 that captures a video frame 306. Video frame recording step 330 records the captured video frame 306 by storing the video frame 306 to a video file 335.

Next, control passes from step 330 to a scene model update step 340, which processes the captured video frame 306. The scene model update step 340 compares the content of the video frame 306 to a stored scene model and updates the scene model 345 accordingly. Next, the stability factor of the scene model is computed in scene model update step 340. The stability is communicated to the user by way of a stability advice step 370. In one arrangement, the advice step 370 displays a star, or other visual indicator, on the camera display 223 or through the optical viewfinder 627. The colour of the star depends on the stability of the scene model. If the scene model is not stable, the star is red. If the scene model is stable, the star is green. In another arrangement, the star has an intensity ranging from black (say a value of 0 intensity, indicating low stability) to white (say a value of 255 intensity, indicating high stability). The grey values in between, for example in increments of 16, indicate varying degrees of stability. In another arrangement, the advice step 370 displays a visual indicator on the camera display 223, wherein the visual indicator flashes while the scene model is not stable and is fixed, that is, not flashing, when the scene model is stable.

In another arrangement, the stability is determined locally. For example, the stability is determined for each pixel or for an 8×8 block of pixels. One implementation displays a representation of the stability of the scene model as a graphical overlay on captured frames, based on scene model information associated with a plurality of blocks in said scene. Another implementation provides an indication to the user of the present stability of the scene model by using an overlay on the captured image displayed on the camera display 223. The local value of the overlay is similar to the aforementioned arrangement for a global stability advice and may include, for example, a red/green star or intensities from black to white. The advantage of the local stability advice is that the camera operator can use the local stability advice to direct subjects in the scene. For example, the camera operator can ask people in the scene to move away from an area for which the scene model is not stable.

Figure 5A:
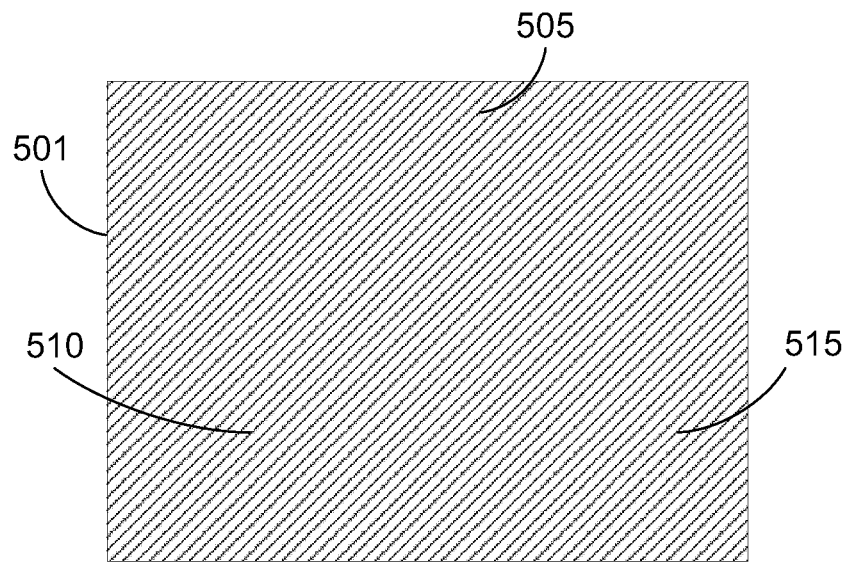
FIGS. 5A to 5D depict an example of a user interface for stability advice on a camera display.

FIGS. 5A to 5D illustrate an example of providing local stability advice. In FIG. 5A, the user starts at time 0 capturing a first frame 501 on a camera. The camera display 223 shows an overlay 505 in the areas that are considered unstable, which is the entire frame 501 at the start of capturing. Although there are foreground objects 510 and 515 in the frame 501, the foreground objects have not yet moved.

Figure 5B:
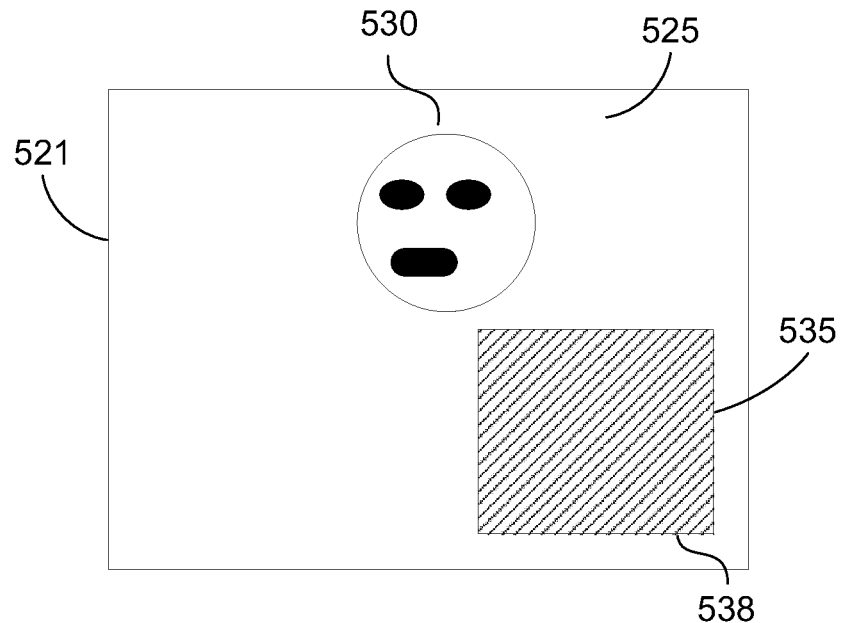

FIG. 5B shows a second frame 521 that is captured at a time 20 seconds after frame 501. The second frame 521 includes a foreground object 530 (corresponding to object 510 in frame 501) that has been moving. As the foreground object 530 was moving, the background in the area of the frame that was occupied by the object 510 in frame 501 was properly exposed, resulting in one or more stable regions. An overlay 525 on frame 521 is shows the area that has achieved stability. In this example, the overlay 525 is fully transparent, but alternatively the overlay may have a different alpha value compared to an overlay 538, which indicates an unstable region or area of the second frame 521.

Object 535 (corresponding to object 515 in frame 501) has not left its place, and has just changed pose on the same place. Because there are changes relating to the pose, no stability is achieved in this area. Overlay 538 shows the region corresponding to the object 535 that has not yet stabilised. At this point, the camera operator has sufficient information to conclude that stability will not be reached unless either object 535 stands very still for a long period, or object 535 moves away to allow the background behind the object 535 to expose. In this example, the camera operator directs object 535 to move away.

Figure 5C:
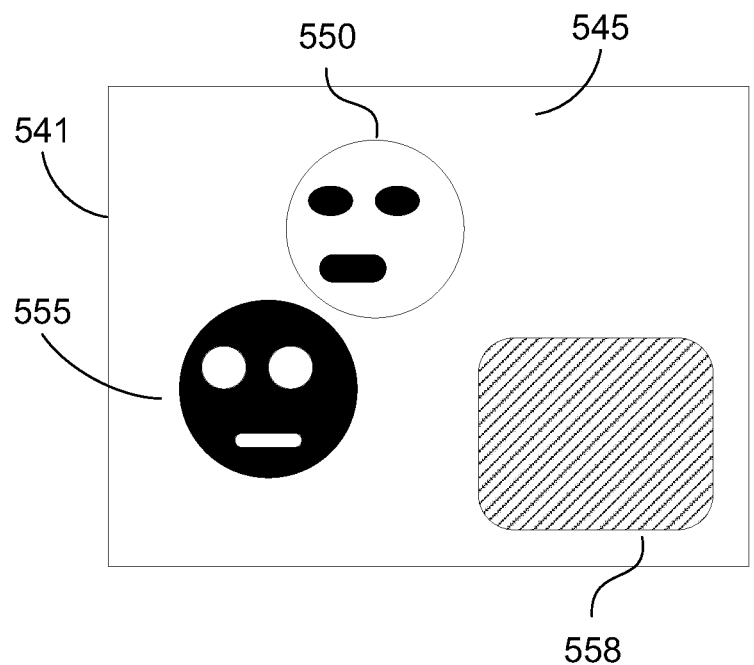

FIG. 5C shows a third frame 541, 2 seconds after frame 521 was captured. The third frame includes a foreground object 555 (corresponding to object 535 in frame 521) that has now moved. A region 558 corresponding to the region 538 that had not reached stability in frame 521 still has not reached full stability in frame 541. This is because more time is needed to determine stability. At the edges, stability will be achieved more quickly, because there is more evidence for the background. The overlay 545 is the same as overlay 525. The location of object 550 does not matter, as long as the location of object 550 is not in the region 558.

Figure 5D:
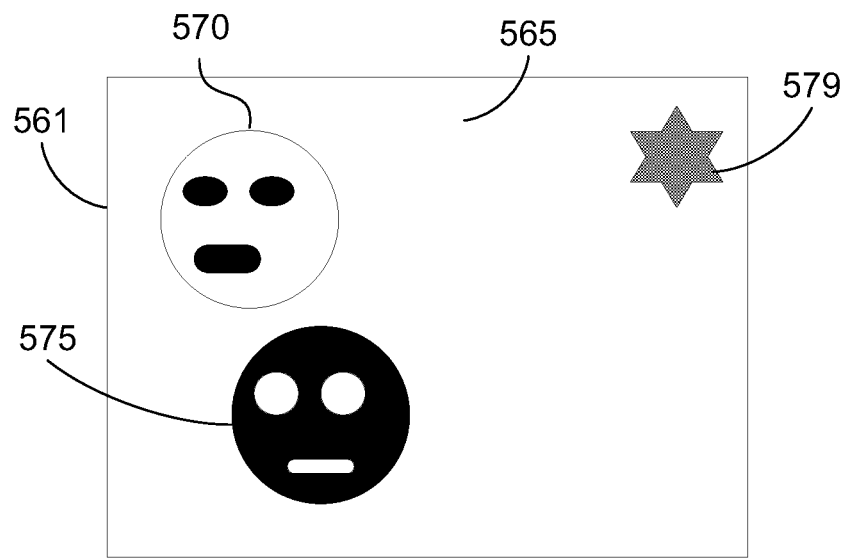

FIG. 5D shows a fourth frame 561 that is captured, say, 8 seconds after capturing frame 541. The whole scene has achieved stability and has a single overlay 565. The overlay 565 in this example is transparent, indicating that an area corresponding to the whole frame 561 is stable. Objects 570 and 575 can now be separated from the background of the scene depicted in the frames 501, 521, 541, and 561. A symbol 579 is shown on the camera display 223, as a stability advice, indicating that full stability has been reached. In another implementation, a stability device is displayed to a user while any area of the frame remains unstable, as a feedback to indicate to the user that further recording is required to achieve stability of the scene.

Returning to FIG. 3, in another arrangement, the stability advice 370 activates an audible warning through a speaker 294 on the camera 200. If the scene model is stable, no audio is generated. If the scene model is stable, a beep is generated. The frequency of beeps can be varied based on the value of the stability factor.

In another arrangement, the stability advice 370 is provided through the on/off light 229 of the camera 200. If the scene model is not stable, the light 229 blinks. If the scene model is stable, the light is permanently on, for example, red. The frequency of blinking can be varied based on the value of the stability factor. As described above with respect to FIG. 1, the stability advice may also be a combination of a visual and audible warning.

Next, control passes from the stability advice step 370 to a use scene model step 380 for further processing. In one arrangement, step 380 is performed before or in parallel with communicating the stability advice step 370. In another arrangement, use of scene model step 380 is performed only when the scene stability factor exceeds a threshold, for example, 0.75. In yet another arrangement, use of scene model step 380 is performed only after an end trigger is received 350, before termination 390.

In one arrangement, the use of scene model step 380 subtracts the captured video frame 306 from the scene model 345. The results are thresholded, resulting in foreground masks and background masks. In one arrangement, the foreground masks are used to extract foreground image data from the video frame. The foreground image data are then stored on a persistent storage medium, such as an SD card. In another arrangement, the video frames are recorded independently and the foreground masks are stored as metadata in each frame.

The resulting foreground separation may be used for applications such as object counting (or people counting if additional people classification technology is available). Another application is adjusting camera settings, such as focus, based on the positions of detected foreground.

Control passes from use scene model 380 to an end trigger decision step 350. If no end trigger has been received at decision step 350, No, control loops back to the video frame capture step 305. If an end trigger has been received at decision step 350, Yes, the process terminates at an End step 390.

Although the computation of scene model stability is described as a separate step in the aforementioned description, in one arrangement the computation is performed at the same time as the scene model update for computational efficiency. In one arrangement, immediately after updating the hit counter value, the values for $hc_1$ and $hc_2$ are determined, and the visual element stability ves is computed.

Alternative Embodiments

In one embodiment, camera 200 captures frames starting at a time $t_A$. The captured frames are processed to generate a scene model. The captured frames are recorded until time $t_B$, which is determined by an external trigger. The recorded frames are stored in a memory or other recordable storage medium. In one arrangement, the external trigger is a push of a button by the camera operator. In another arrangement, the external trigger is part of the camera system, but not part of the instant scene modelling method. For example, in one embodiment the external trigger is caused by the camera system approaching the maximum recording space capacity on a storage medium, such as an SD card, and the external trigger activates an alert to provide an indication to the user that recording space is almost exhausted. The external trigger is initiated before full capacity of the storage is reached, for example 2 MB before maximum recording space capacity, so that it is possible to commit object metadata to storage. At time $t_C$, the instant scene modelling method determines that the scene model is stable.

Figure 4A:
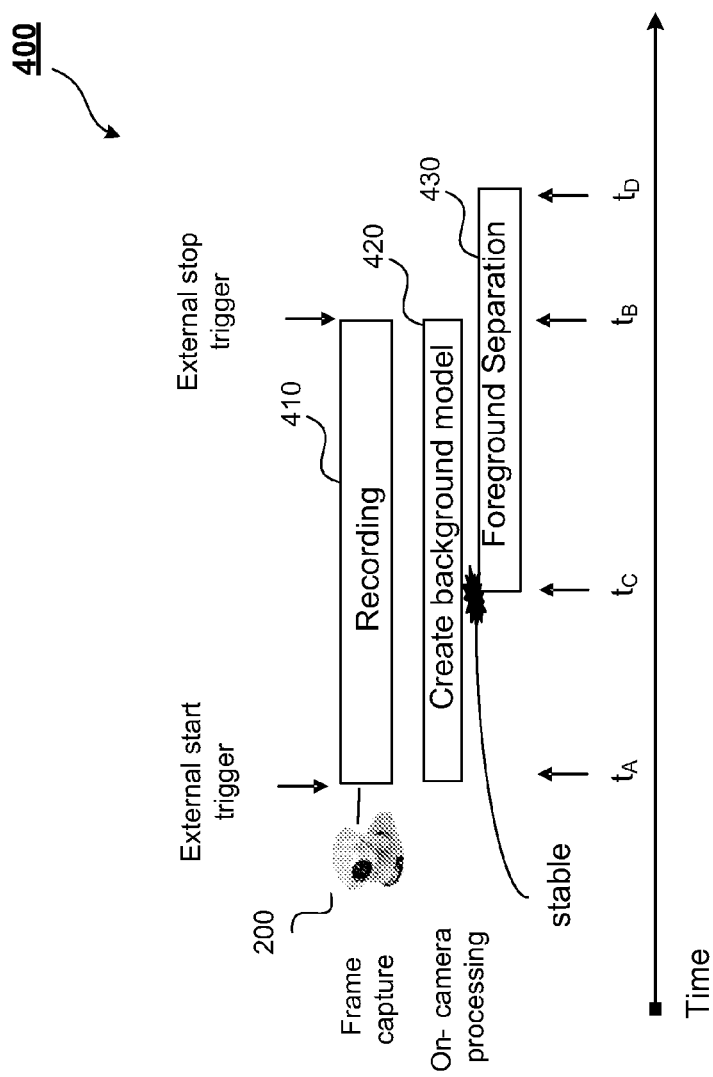
FIG. 4A is a schematic representation of a scenario embodying instant scene modelling.
Figure 4B:
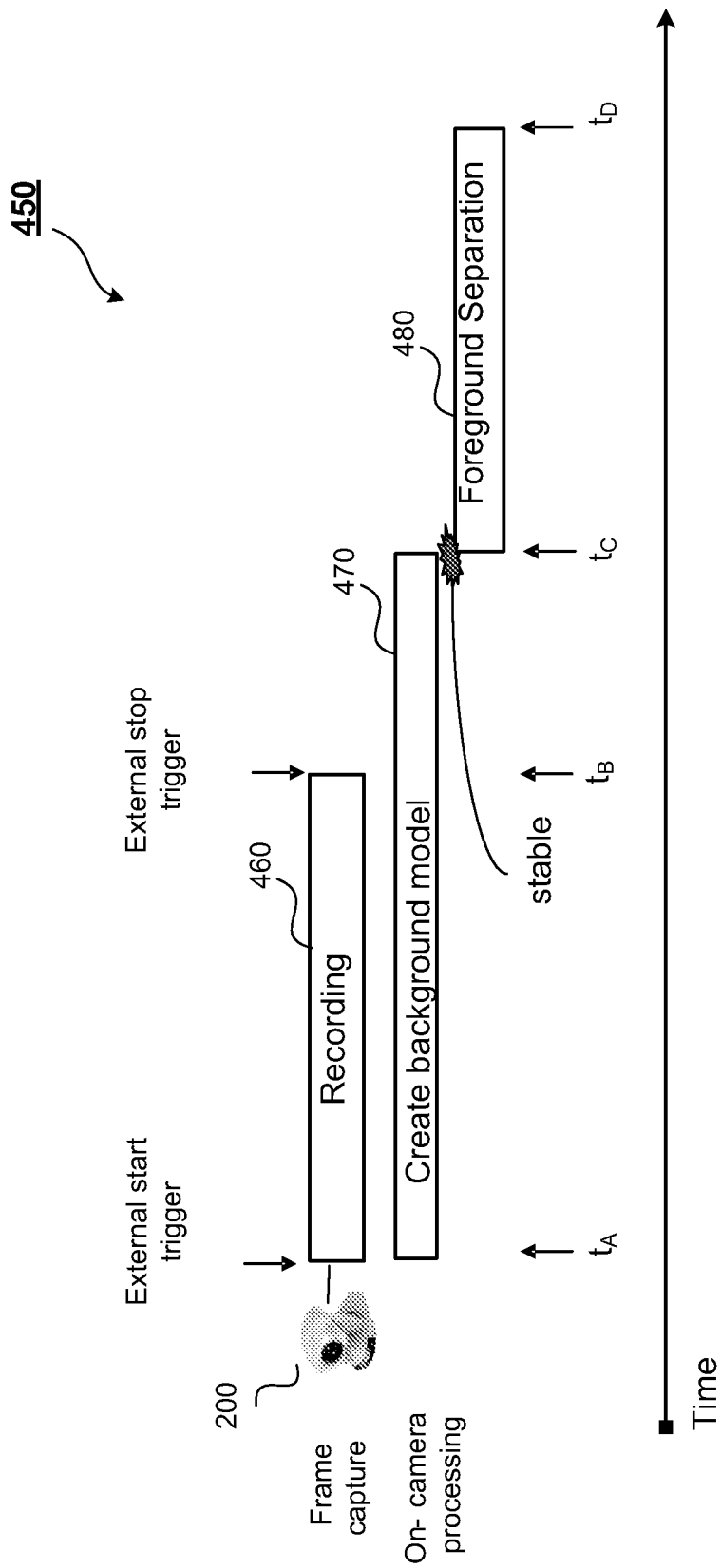
FIG. 4B is a schematic representation of another scenario embodying instant scene modelling.

FIGS. 4A and 4B are schematic representations of two scenarios embodying the instant scene modelling method of the present disclosure. FIG. 4A illustrates a scenario 400 in which $t_C$ is before $t_B$. An external start trigger activates the camera 200 to begin recording 410 of an image sequence at time $t_A$. The camera records the image sequence by capturing successive frames over time. The camera 200 processes each frame as it is captured, using the controller 222, to create and subsequently update a background model 420 associated with a scene that is being captured by the image sequence. Foreground separation cannot be performed until the background model has achieved a desired level of stability.

In the example of FIG. 4A, the controller 222 determines at time $t_C$ that the background model is stable. As $t_C$ is before $t_B$, in this example, the camera is still recording the image sequence at the time at which the background model is determined to be stable. Accordingly, recording of the image sequence continues until an external end trigger is received at time $t_B$ to terminate the recording 410 of the image sequence. While the background model is determined to be stable at time $t_C$, the controller 222 continues to update the background model as each new frame is captured, up until recording terminates at time $t_B$. In an alternative embodiment, once the controller 222 determines that the background model is stable at time $t_C$, the controller 222 stops updating the background model. In this example, the image sequence is delimited by a first frame captured at time $t_A$ and a later, second frame captured at time $t_B$.

Once the camera determines that the background model is stable, at time $t_C$, the camera 200, or a computing device off-camera, can perform foreground separation 430 on the image sequence. Foreground separation may commence at time $t_C$ and continue until a time $t_D$, which may be a considerable time after time $t_B$. Alternatively, foreground separation can be performed either by the camera 200 or by an off-camera device, such as a general purpose computer, at any later time.

In one example in which $t_C$ is before $t_B$, the scene model is applied immediately to all captured frames from $t_A$ until $t_B$. In one arrangement, the foreground/background separation is processed faster than the capture frame rate. The foreground/background separation eventually reaches the current frame and then slows down to operate at the capture frame rate until $t_B$ is reached. In another arrangement, the foreground/background separation is performed at the capture frame rate and the foreground masks are shown as an overlay on camera display 223. The frames from $t_A$ to $t_C$ are processed only after $t_B$ is reached. In another arrangement, the scene model is stored and foreground/background separation can be performed off-line, for example on the camera or on another device, such as a Personal Computer (PC) or other computing device.

FIG. 4B illustrates a scenario 450 in which $t_C$ is after $t_B$. An external start trigger activates the camera 200 to begin recording 460 of an image sequence at time $t_A$. The camera records the image sequence by capturing successive frames over time. The camera 200 processes each frame as it is captured, using the controller 222, to create and subsequently update a background model 470 associated with a scene that is being captured by the image sequence. Foreground separation cannot be performed until the background model has achieved a desired level of stability.

In the example of FIG. 4B, an external stop trigger is received at time $t_B$. At time $t_B$, the controller 222 has not yet determined that the background model is stable. The camera stops recording the image sequence, but continues to capture further frames to update the background model. In contrast to the recorded image sequence 460, the further frames are not stored. In order to indicate to the operator of the camera that further frames are being captured for the enhancement of the background model, and thus the operator should continue to keep the camera steady, the camera 200 issues an alert. As described above, is such a feedback or alert may be a visual indicator, an audible indicator, or a combination thereof.

The camera 200 captures further frames and updates the background model until the controller 222 determines at time $t_C$ that the background model is stable. Once the background model is determined to be stable at time $t_C$, the camera 200, or a computing device off-camera, can perform foreground separation 480 on the image sequence. Foreground separation may commence at time $t_C$ and continue until a time $t_D$, which may be a considerable time after time $t_B$. Alternatively, foreground separation can be performed either by the camera 200 or by an off-camera device, such as a general purpose computer, at any later time. In this example, the image sequence is delimited by a first frame captured at time $t_A$ and a later, second frame captured at time $t_C$.

If $t_C$ is not before or at $t_B$, frame capturing, scene model updating, and scene model stability determination continues until the scene model is considered stable. The system notifies the camera operator that the camera is to be kept in the same position, capturing the same fixed field of view. The camera operator may decide to direct the scene content, such as by asking objects to move to another position or even outside the field of view. When $t_C$ is reached, the system notifies the camera operator that the process has completed.

Conclusion

The instant scene modelling method described herein enables a camera operator to change the length and content of a video capture such that foreground separation and object extraction can be performed accurately. The camera operator does not have to plan to record video purely for the purpose of scene modelling prior to recording the video of interest. This is important, because often the camera operator knows that the video is of interest only after recording has started, as actors may be unpredictable, especially in home videos. In addition, the extra capturing for the purpose of foreground separation is minimised. If extra capturing is not necessary, the camera operator will make a recording as he or she normally would.

By using a scene modelling technique rather than direct frame subtraction, the risk of impulse noise and scene changes, such as a lighting change due to moving clouds, is mitigated. Also, using a scene modelling technique does not require the entire field of is view to be empty simultaneously. The instant scene modelling can cope with foreground objects being in the field of view all the time, as long as the foreground objects move around in the field of view sufficiently to be differentiated from the background.

INDUSTRIAL APPLICABILITY

The arrangements described are applicable to the computer and data processing industries and particularly for the imaging and security industries.

The foregoing describes only some embodiments of the present invention, and modifications and/or changes can be made thereto without departing from the scope and spirit of the invention, the embodiments being illustrative and not restrictive.

I claim:

1. A computer-implemented method of activating a scene model stability indicator of a camera for a scene model of a scene to separate a background and a foreground, said method comprising the steps of:
    capturing at least one frame in an image sequence;
    updating the scene model based on at least one of the captured frames from a start time to a current time;
    determining the scene model stability associated with a current updated scene model; and
    controlling a display of the scene model stability indicator of the camera while capturing frames, to notify a user that the current updated scene model can be used to separate the foreground from the background in the scene, dependent upon the determined scene model stability.

2. The method according to claim 1, further comprising the step of performing foreground separation on at least one frame from the captured image sequence, based on the scene model.

3. The method according to claim 1, comprising the further step of: creating the scene model, based on at least one of:
    (a) training data,
    (b) random values, and
    (c) at least one frame from the image sequence.

4. The method according to claim 1, wherein said capturing step occurs during a recording session, the recording session being active in a time period between receiving a start trigger and receiving an end trigger.

5. The method according to claim 1, further comprising the step of:
updating the scene model, based on at least one captured subsequent frame.

6. The method according to claim 1, wherein said controlling step of controlling the display includes providing feedback to the user that includes at least one of an audible indicator and a visual indicator.

7. The method according to claim 1, wherein the scene model stability indicator is derived from a predetermined set of visual elements in the scene.

8. The method according to claim 1, further comprising the step of:
displaying a representation of the scene model stability indicator as a graphical overlay on captured frames, based on scene model information associated with a plurality of blocks in the scene.

9. The method according to claim 1, further comprising a step of controlling the display to specify a region which has not stabilized in the captured frames based on the determined scene model stability.

10. A camera system for activating a scene model stability indicator of a camera for a scene model of a scene to separate a background and a foreground, said camera system comprising:
an optical system;
a sensor;
a storage device configured to store a computer program; and
a controller coupled to each of said optical system and said sensor to capture at least one frame in an image sequence, said controller including a processor configured to execute the program, said program comprising:
computer program code for updating the scene model based on at least one of the captured frames from a start time to a current time;
computer program code for determining the scene model stability associated with a current updated scene model; and
computer program code for controlling a display of the scene model stability indicator of the camera while capturing frames, to notify a user that the current updated scene model can be used to separate the foreground from the background in the scene, dependent upon the determined scene model stability.

11. The camera system according to claim 10, wherein said program comprises code for controlling the display to specify a region which has not stabilized in the captured frames based on the determined scene model stability.

12. A non-transitory computer readable storage medium having recorded thereon a computer program for directing a processor to execute a method of activating a scene model stability indicator of a camera for a scene model of a scene to separate a background and a foreground, said computer program comprising code for performing the steps of:
capturing at least one frame in an image sequence;
updating the scene model based on at least one of the captured frames from a start time to a current time;
determining the scene model stability associated with a current updated scene model; and
controlling a display of a scene model stability indicator of the camera while capturing frames, to notify a user that the current updated scene model can be used to separate the foreground from the background in the scene, dependent upon the determined scene model stability.

13. The non-transitory computer readable storage medium according to claim 12, wherein said program comprises code for controlling the display to specify a region which has not stabilized in the captured frames based on the determined scene model stability.

14. A computer-implemented method of creating a scene model of a scene, and separating a background and a foreground, said method comprising the steps of:
capturing frames in an image sequence from a start time;
updating the scene model based on at least one of the captured frames from the start time to a current time;
determining the scene model stability of a current updated scene model;
determining if the current updated scene model is stable to distinguish the background from the foreground in the scene, based upon the determined scene model stability; and
separating the foreground from the background in captured frames before the current updated scene model is determined to be stable while capturing a current frame.

15. A camera system for creating a scene model of a scene, and separating a background and a foreground, said camera system comprising:
an optical system;
a sensor;
a storage device configured to store a computer program;
a controller coupled to each of said optical system and said sensor to capture an image sequence, said controller including a processor configured to execute the program, said program comprising:
computer program code for capturing frames in an image sequence from a start time;
computer program code for updating the scene model based on at least one of the captured frames from the start time to a current time;
computer program code for determining the scene model stability of a current updated scene model;
computer program code for determining if the current updated scene model is stable to distinguish the background from the foreground in the scene, based upon the determined scene model stability; and
computer program code for separating the foreground from the background in captured frames captured before the current updated scene model is determined to be stable while capturing a current frame.

16. A method of providing information relating to the suitability of captured video content for creating a scene model of a scene for separating the foreground and the background of said scene, said method comprising the steps of:
computing a measure of scene model stability based on the captured video content; and
providing feedback to indicate that further video content is required to create the scene model, dependent upon the measure of scene model stability.

* * * * *